United States Patent [19]

Futrell et al.

[11] Patent Number: 5,154,493
[45] Date of Patent: Oct. 13, 1992

[54] ANTI-THEFT BRAKE LOCK

[76] Inventors: Michael O. Futrell; Ruth E. Futrell, both of 400 W. Belding, Hot Springs, Ark. 71901

[21] Appl. No.: 694,080

[22] Filed: May 1, 1991

[51] Int. Cl.⁵ .................................... F15B 15/26
[52] U.S. Cl. ........................ 303/89; 188/353; 60/570
[58] Field of Search .............. 303/89; 188/265, 353; 280/287; 60/568, 570

[56] References Cited

U.S. PATENT DOCUMENTS

| | | | |
|---|---|---|---|
| 2,287,562 | 6/1942 | Pennington | 188/353 |
| 2,574,821 | 11/1951 | Forman | 188/353 |
| 4,793,661 | 12/1988 | Munro | 188/353 X |
| 4,873,824 | 10/1984 | Cox | 60/570 |

Primary Examiner—Matthew C. Graham
Attorney, Agent, or Firm—Richard C. Litman

[57] ABSTRACT

An anti-theft system for vehicles pressurizes and locks the hydraulic brakes whenever voltage is removed from a special master brake cylinder. The master brake cylinder has all the conventional parts, but the central rod which carries the hydraulic pistons extends past the usual point and attaches to a permanent magnet at the end of the rod. A coil spring forces the rod in the direction of rod movement needed for brake activation, toward a solenoid. The solenoid is powered by the vehicle battery. The spring is prevented from continuously engaging the brakes by the magnetic repulsion of the permanent magnet by the solenoid. The magnetic force acts to disengage the brakes. When the current is cut off, so is the magnetic repulsion, and the unbalanced force of the spring pushes the rod to engage the brakes. The solenoid current can be switched on or off by a remote switch. The switch may be closed and opened remotely through a radio link. The construction of the invention is such that if a thief disassembles the solenoid, the brake fluid will leak out and make the vehicle undrivable. There is no power drain when the vehicle is locked, only when it is driven.

6 Claims, 2 Drawing Sheets

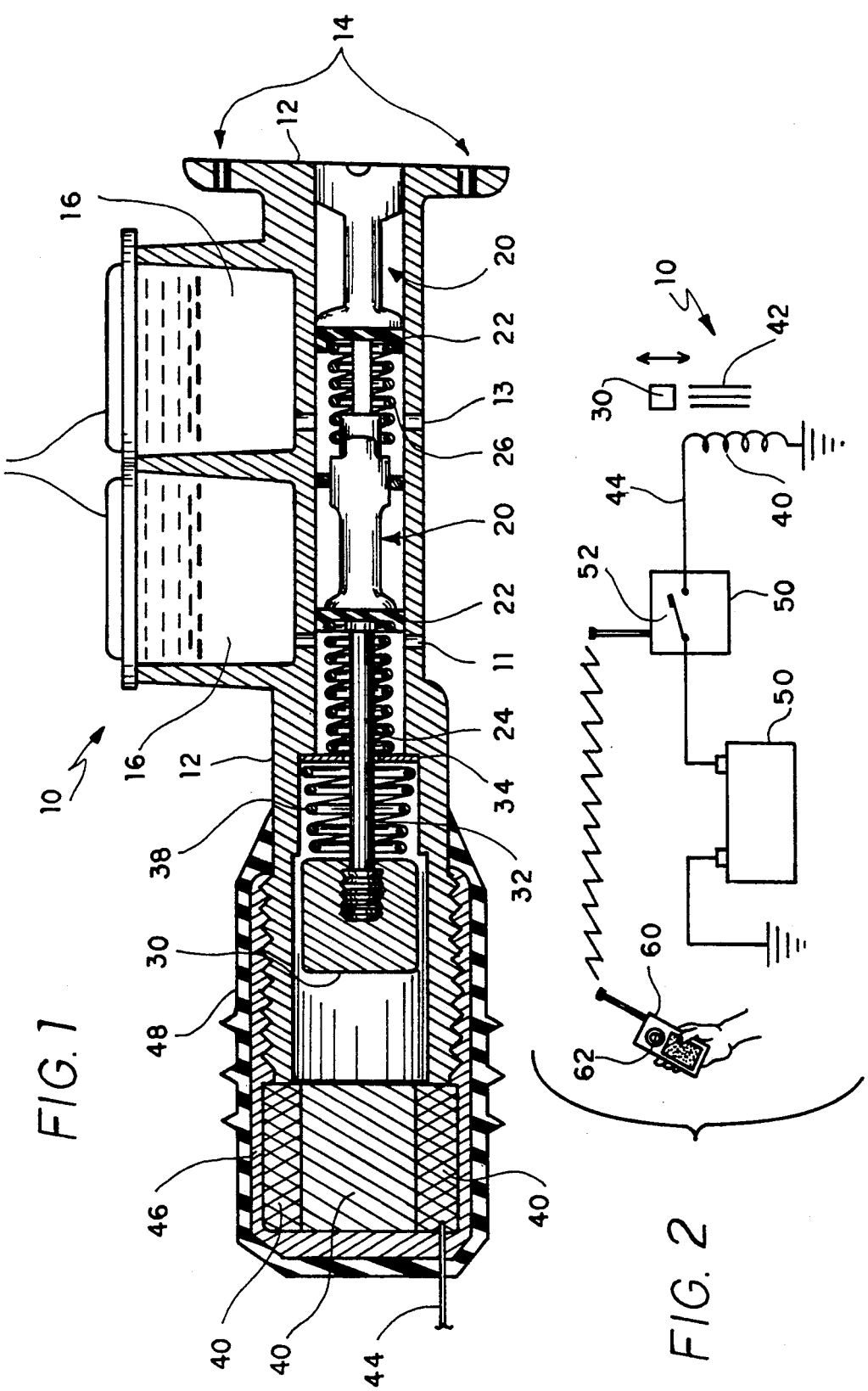

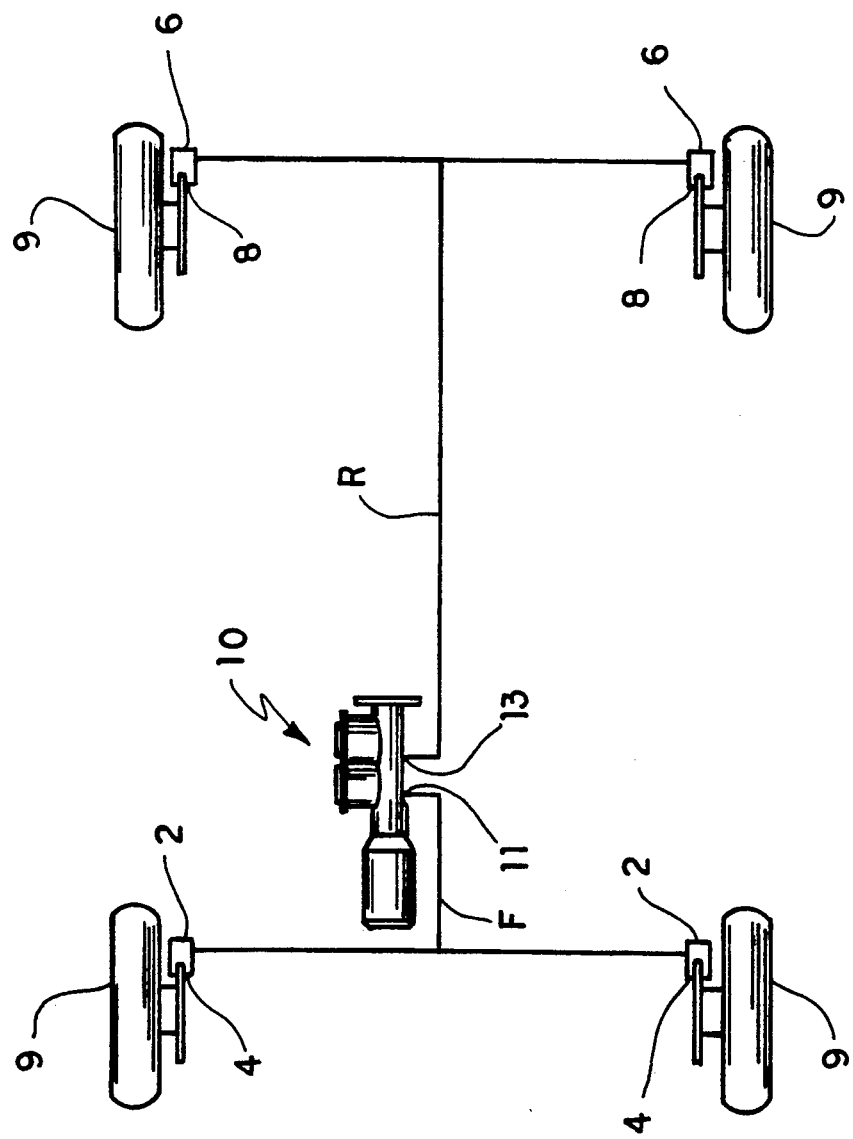

ANTI-THEFT BRAKE LOCK

FIELD OF THE INVENTION

The present invention relates to anti-theft devices for vehicles which engage the vehicle brakes to prevent motion.

DESCRIPTION OF THE PRIOR ART

Theft of vehicles is a major problem today. Theft attempts are countered by door and ignition locks on all vehicles, but these are no obstacle to a thief who is equipped with the right tools. Because of the inadequacy of the standard anti-theft measures, many people equip their vehicles with additional devices, such as alarms.

Numerous inventions have attempted to address the problem of vehicle theft with mechanisms that disable various systems which are essential for driving the vehicle away. One example is the numerous sorts of lock bars that prevent turning of the steering wheel. Other inventions disable the ignition circuit, plug the fuel lines, or jam other parts needed to drive the vehicle away.

For example, Brandt in U.S. Pat. No. 4,371,052 shows an electronic ignition lock; U.S. Pat. No. 4,660,528 issued to Buck discloses a system for cutting off fuel and stopping a vehicle after it is stolen.

Several inventors have chosen the brakes as the vehicle system to be disabled for preventing thefts.

Mann, et al., in U.S. Pat. No. 4,691,801, disclose a system for preventing truck theft. A hand-held remote infrared transmitter signals a central controller on the truck to lock various mechanisms, such as the ignition. The system locks the pneumatic parking brake of the truck. When the parking brakes are not engaged, air pressure is applied to the brakes, causing them to release. The remote-controlled solenoid of the invention closes a valve which allows repressurization of the parking brake lines, therefore preventing release of the parking brakes. The Mann invention is adaptable only to vehicles which use a certain type of pneumatic parking brake; it cannot be used on the large majority of cars and trucks which are equipped with hydraulic brakes.

Batlle Crosas, in U.S. Pat. No. 4,300,057, teaches the use of an electromagnetic switched valve in the brake line of a vehicle. The switch is locked and unlocked by coded electronic signals.

Batlle Crosas' valve is of the ball type, in which a ball bearing or similar sphere is held near to a seat; when the ball rests against the seat no fluid can pass from the ball side to the seat side. Batlle Crosas discloses in his FIG. 4 that the valve is placed in a single brake line exiting from what is apparently a single-piston master cylinder. He does not teach doubling the valve, so his invention is not adaptable to the modern master brake cylinder, which always includes two independent pistons acting on different sets of wheels through independent brake lines, for safety. (If one of the two hydraulic circuits fails, the other will still be available to stop the vehicle.)

Batlle Crosas' valve ball is loosely trapped in a shallow cavity in the end of a sliding iron plunger. The plunger and ball can be forced toward or away from the valve seat by either of two distinct and separate counter-wound solenoids surrounding the iron plunger. This "dual effect coil" is an essential element of the invention, listed in all claims of Batlle Crosas. When the iron plunger is magnetically forced toward the valve seat the valve is closed. When the contra-wound solenoid is powered the ball is drawn off the seat and the valve is opened.

Apparently, the valve is set into the brake line so that the ball side of the valve is toward the wheel slave cylinders, and the seat is toward the master cylinder. The plunger and ball will then be held against the seat by brake fluid pressure after the brake pedal is depressed. (Batlle Crosas mentions this mode of use.)

The brakes will tend to "lock" with this valve orientation, because return flow from the slaves to the master cylinder when the brake pedal is released will carry the ball onto the seat. Release of the brakes after each use may thus require energizing of that solenoid coil which pulls the ball off of the seat; both electric power and electronic controls are needed for this. If the solenoid system fails while driving, danger will result.

If, conversely, the ball were on the master cylinder side, then a very great solenoid force would be required to hold the ball against the seat strongly enough to stop leakage of the pressurized brake fluid in the slave cylinders. A large amount of current would be required to generate such a strong magnetic field. The battery would drain quickly if the vehicle were left "locked" for long. Also, the solenoid would be needed to hold the ball and plunger off the seat during ordinary braking, or the brakes would simply not work at all.

If the teachings of Batlle Crosas were ignored, and his invention were to be adapted to dual piston brake cylinders of the type now almost universal, the valve would have to be doubled, which would double the risk of a jammed valve. A jam would be dangerous, since only two wheels of the auto or truck would lock, causing an uncontrollable skid.

The Batlle Crosas device can be disabled by a thief smashing the electronics or cutting wires leading to the coils.

None of the above inventions and patents, taken either singly or in combination, is seen to describe the instant invention as claimed.

None of the above inventions and patents discloses an anti-theft brake locking system which can be adapted to the vast majority of hydraulic brake systems, which will prevent thefts even if destroyed, which is simple to design and operate, and which can maintain a locked brake condition without power drain.

Accordingly, one object of the present invention is a brake locking anti-theft system which does not draw power when locked.

Another object of the present invention is a brake locking anti-theft system which will prevent thefts even if destroyed by thieves.

Still another object of the present invention is a brake locking anti-theft system which can be remotely enabled and disabled.

These and other objects of the present invention will become readily apparent upon further review of the following specification and drawings.

SUMMARY OF THE INVENTION

The present invention is an anti-theft system for vehicles which pressurizes and locks the hydraulic brakes whenever voltage is removed from a special master brake cylinder. The master brake cylinder has all the conventional parts, but the central rod which carries the hydraulic pistons extends past the usual point and attaches to a permanent magnet at the end of the rod. A coil spring forces the rod in the direction of rod movement needed for brake activation, toward a solenoid. The solenoid is powered by the vehicle battery. The spring is prevented from continuously engaging the brakes by the magnetic repulsion of the permanent magnet by the solenoid. The magnetic force acts to disengage the brakes. When the current is cut off, so is the magnetic repulsion, and the unbalanced force of the spring pushes the rod to engage the brakes. The solenoid current can be switched on or off by a remote switch. The switch may be closed and opened remotely through a radio link. The construction of the invention is such that if a thief disassembles the solenoid, the brake fluid will leak out and make the vehicle undrivable. There is no power drain when the vehicle is locked, only when it is driven.

BRIEF DESCRIPTION OF THE DRAWINGS

FIG. 1 is a cross-sectional elevation view of the master cylinder of the present invention, showing the conventional fluid reservoirs, housing and pistons, and the extended rod, permanent magnet, and solenoid of the present invention.

FIG. 2 is a schematic view of the activation system showing the hand-held remote control, the vehicle battery, the switch and the solenoid of the present invention.

FIG. 3 shows a conventional brake system showing the placement of the anti-theft unit.

Similar reference characters denote corresponding features consistently throughout the attached drawings.

DETAILED DESCRIPTION OF THE PREFERRED EMBODIMENT

The present invention includes a special brake master cylinder having a solenoid and an electronic control system to energize and de-energize the solenoid. The solenoid is pictured in FIG. 1. In the following discussion, "front" refers to the front of the vehicle, which is toward the left side of FIG. 1 in accordance with the usual orientation of a master cylinder against the firewall of a vehicle.

Referring to FIG. 1, a hydraulic brake master cylinder 10 includes the following conventional parts: a housing 12 with an attachment flange at its rear end, with bolt holes 14 for attaching the housing 12 to a vacuum pump unit; twin hydraulic fluid reservoirs 16, with covers 18 to keep out dust and moisture; twin pistons 20 with sliding rubber cup seals 22, both sliding together within a cylindrical bore of the housing 12; and return springs 24 to return the pistons 20 to their rest positions and hold the cup seals 22 against the pistons 20.

FIG. 3 illustrates the placement of the dual hydraulic brake master cylinder 10 in relation to other parts of a conventional vehicle braking system. Front hydraulic lines F extend from outlet 11 of dual master cylinder 10 to slave cylinders 2 of front brake units 4. Rear hydraulic lines R extend from outlet 13 of master cylinder 10 to slave cylinders 6 of rear brake units 8. All the brake units serve to arrest the rotation of their associated vehicle wheels 9.

The cylinder 10 also includes unconventional parts of the present invention. An extension rod 32 extends from the front end of the foremost piston 20. The extension rod 32 is coaxial with the bore of the housing 12 in which the pistons 20 ride. The rear end of the rod may be fixed to the front end of the front piston or be integral with it. Any mechanical arrangement will work in which longitudinal motions of the extension rod 32 cause longitudinal motions of the pistons. The front end of the extension rod 32 is firmly fixed to a preferably cylindrical permanent magnet 30 by mating threads, strong adhesive, or other means.

The magnet 30 produces a magnetic field whose axis is aligned with the bore of the housing 12. In FIG. 1, a north pole and a south pole will be disposed on opposite sides of the magnet 30, along the piston bore axis.

The extension rod 32 slides through a washer or plate 34 which rests against an annular shoulder 36 where the piston bore expands to a bore of larger diameter, coaxial with the piston bore. The plate 34 has a central hole to pass the rod 32. The fit between the rod 32 and the hole of the plate 34 is loose, so that hydraulic brake fluid can leak easily through the annular gap.

The plate 34 serves both to support the rod 32 and to act as a stop against which a coil spring 38 bears. The other end of the spring 38 bears against the flat rear cylindrical end of the magnet 30. In the position shown, the spring 38 is under compression. The position shown is also that position in which the brake pedal is released, and the brakes are disengaged so that the wheels are free to rotate. The spring 38 is strong enough that, were it not restrained, it would force the magnet 30 forward to engage the brakes, locking the wheels of the vehicle.

Any force means other than the spring 38 could be used. A leaf spring, pressurized fluid, and the like could be employed.

A restraining rearward force on the magnet 30 must be provided when the vehicle is being driven, to disengage the brakes and allow the vehicle to move. This disengaging force is provided by an electromagnet which acts magnetically on the permanent magnet 30.

The electromagnet is preferably a cylindrical solenoid 40 wound about a cylindrical soft iron core 42. The core 42 magnifies the magnetic field of the solenoid 40. The solenoid 40 is powered through a wire 44; the current passing out of the solenoid 40 passes to ground either through the housing 12 or another wire (not shown). The winding of the solenoid 40 and the polarity of the supplied voltage from the wire 44 are chosen so that the magnetic field of the solenoid 40 is rotated 180° from the field of the permanent magnet 30; that is, like poles are adjacent, so that the two magnets repel each other when the solenoid 40 is charged.

The solenoid 40 and core 42 are supported by a threaded magnetic housing 46 which threads onto the forward end of the housing 12. The magnetic housing 46 may be made of a metal like soft iron or Permalloy which concentrates magnetic field lines, to increase the field near the rear end of the magnetic housing 46. The magnetic housing 46 is preferably covered by a rubber boot 48.

From the foregoing discussion it will be seen that, when voltage is applied to the solenoid wire 44, the magnet 30 will be forced to the rear, compressing the spring 38. The magnetic force on the magnet 30 may be adjusted to be slightly more than the opposing force of the spring 38 on the magnet 30. Normal pressure on the brake pedal (not shown) will then move the pistons 20 forward and engage the brakes for use while driving. When voltage is removed, the solenoid 40 will not oppose the force of the spring 38 and the pistons 20 will be pushed forward by the force of the spring 38 acting through the rod 32. This will engage the brakes, preventing motion of the vehicle until current once again flows through the solenoid 40. Thus, to protect the vehicle from theft or unauthorized use, the only requirement is that the voltage be kept from the solenoid 40.

During vehicle use, the solenoid is powered and the vehicle's generator can easily provide the current needed. When the vehicle is stopped and the brakes engaged, no current is drawn. Thus the present invention will keep the brakes engaged and the vehicle locked against theft indefinitely.

Referring now to FIG. 2, the means for energizing and deenergizing the solenoid 40 is disclosed. The solenoid 40, core 42 and magnet 30 are shown schematically on the right. The wire 44 is shown leading to a radio receiver 50. The receiver contains a switch 52 which, when closed, electrically connects the solenoid 40 to one terminal of the vehicle battery 56. The receiver 50 will be mounted to the vehicle.

The receiver 50 may be signaled to throw the switch 52 by a hand-held radio transmitter 60. A button 62 on the transmitter 60 is depressed to activate the transmitter 60 to signal to the receiver 50. Other signal means may be employed, and various signals can be used.

The switch 52 may be of the bistable or latching type, so that only one type of signal need be sent to change the state of the switch 52. The radio may be replaced by a sonic device, microwave link, etc. Any sort of remote signal can be used to trip the switch 52.

A manual switch may also be used, mounted on the vehicle. Such a manual switch could include a switch lock to prevent thieves from closing the switch to disengage the brakes.

The present invention has the advantage that overcoming the locking of the vehicle by disengaging the brakes requires that a voltage be supplied. Random tinkering or partial destruction by a thief will not lead to release.

It is to be noted that, in case of a thief breaking open the master cylinder 10, the brake fluid will leak out through the plate 34, making the vehicle undrivable.

It is also to be noted that, if the brake lights are activated by a contact switch on the pedal mechanism rather than by a pressure switch on the master cylinder or brake lines, the brake lights will not be lighted when the brakes are disengaged by cutting off current to the solenoid 40.

The present invention functions as a parking brake, as well as an anti-theft device.

Because the solenoid 40 is wired directly to the vehicle battery when switch 52 is closed, there is no risk of brake lock when the engine stalls.

It is to be understood that the present invention is not limited to the sole embodiment described above, but encompasses any and all embodiments within the scope of the following claims.

We claim:

1. An anti-theft system for a vehicle having a braking system of the type including a master cylinder, the master cylinder including at least one piston for pressurizing brake fluid to activate a wheel slave cylinder to engage a vehicle brake, the piston slidable in a bore of the master cylinder, the bore having an axis, the brake resisting vehicle motion when engaged; wherein the improvement comprises:
   force means for exerting an engaging force on the piston to engage the brake, said engaging force acting in an engaging direction, said engaging direction parallel to the axis;
   a permanent magnet attached to the piston to exert a disengaging force on the piston to disengage the brake when said magnet is exposed to a magnetic field, said disengaging force acting in a disengaging direction, said disengaging direction parallel to the axis, said disengaging direction opposite to said engaging direction;
   a solenoid for generating said magnetic field, said solenoid mounted to the master cylinder adjacent said magnet, said solenoid aligned and wound to exert said disengaging force on the piston through said magnet; and
   a switch for electrically connecting said solenoid to a source of electricity to send current through said solenoid and generate said magnetic field; whereby
   when an electric voltage of a proper polarity is applied to said solenoid by an operator closing said switch, the brake is disengaged and may be reengaged by other means for normal use by the operator; and
   when said electric voltage of said proper polarity is removed from said solenoid by said operator opening said switch, the brake is engaged to prevent unauthorized motion of the vehicle.

2. An anti-theft system as in claim 1 wherein said solenoid is mounted to the master cylinder by a magnetic housing, said magnetic housing adapted to increase said disengaging force by affecting said magnetic field.

3. An anti-theft system as in claim 2 wherein said housing mounts to the master cylinder by threads.

4. An anti-theft system as in claim 2 wherein the master cylinder is adapted to allow the brake fluid to leak out of the master cylinder when said housing is removed from the master cylinder, whereby the brake will not engage after removal of said housing due to loss of the brake fluid and the vehicle will not be drivable.

5. An anti-theft system as in claim 1 including:
   a switch locking system for opening and closing said switch by only authorized persons.

6. An anti-theft system as in claim 5 wherein said switch locking system comprises:
   said switch;
   switch activation means;
   a receiver to trigger said activation means to open or close said switch; and
   a transmitter to remotely signal said receiver to trigger.

* * * * *